(12) United States Patent
Burghardt

(10) Patent No.: US 9,797,407 B2
(45) Date of Patent: Oct. 24, 2017

(54) AIRCRAFT ENGINE

(71) Applicant: Rolls-Royce Deutschland Ltd & Co KG, Blankenfelde-Mahlow (DE)

(72) Inventor: Sascha Burghardt, Vogelsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 494 days.

(21) Appl. No.: 14/326,999

(22) Filed: Jul. 9, 2014

(65) Prior Publication Data

US 2015/0016994 A1    Jan. 15, 2015

(30) Foreign Application Priority Data

Jul. 10, 2013   (DE) .......................... 10 2013 213 517

(51) Int. Cl.
  *F01D 25/16*   (2006.01)
  *F04D 29/04*   (2006.01)
  (Continued)

(52) U.S. Cl.
  CPC ............. *F04D 29/04* (2013.01); *F01D 25/16* (2013.01); *F04D 13/02* (2013.01); *F01D 5/14* (2013.01);
  (Continued)

(58) Field of Classification Search
  CPC .......... F01D 5/14; F01D 25/162; F01D 25/16; F04D 29/2216; F04D 29/04; F04D 13/02;
  (Continued)

(56) References Cited

U.S. PATENT DOCUMENTS

| 3,834,157 A | 9/1974 | Hoffman |
| 6,619,030 B1 * | 9/2003 | Seda ...................... F01D 9/041 60/226.1 |

(Continued)

FOREIGN PATENT DOCUMENTS

| DE | 2363339 | 8/1974 |
| DE | 102010049885 | 5/2012 |

(Continued)

OTHER PUBLICATIONS

European Search Report dated Nov. 11, 2014 for counterpart European patent application No. 14175831.8.

(Continued)

*Primary Examiner* — Woody Lee, Jr.
*Assistant Examiner* — Behnoush Haghighian
(74) *Attorney, Agent, or Firm* — Shuttleworth & Ingersoll, PLC; Timothy Klima

(57) ABSTRACT

An aircraft engine including a fan having a center of mass, a low-pressure shaft that couples the fan directly to a low-pressure turbine of the aircraft engine, and a bearing arrangement for mounting the low-pressure shaft, where the bearing arrangement has at least two front bearings for mounting the low-pressure shaft, a first front bearing and a second front bearing, with the first front bearing being arranged in the axial direction in front of the second front bearing. It has been provided that the first front bearing is arranged substantially in the same plane, extending perpendicular to the longitudinal axis of the aircraft engine, as the center of mass of the fan.

16 Claims, 3 Drawing Sheets

(51) Int. Cl.
*F04D 13/02* (2006.01)
*F02C 7/268* (2006.01)
*F04D 29/22* (2006.01)
*F02C 7/06* (2006.01)
*F01D 5/14* (2006.01)

(52) U.S. Cl.
CPC .............. *F01D 25/162* (2013.01); *F02C 7/06* (2013.01); *F02C 7/268* (2013.01); *F04D 29/2216* (2013.01); *Y02T 50/671* (2013.01)

(58) Field of Classification Search
CPC .... F02C 7/06; F02C 7/268; F02C 7/00; F02K 1/78
See application file for complete search history.

(56) References Cited

U.S. PATENT DOCUMENTS

| | | | |
|---|---|---|---|
| 7,011,490 B2* | 3/2006 | Albrecht | F01D 21/045 415/174.4 |
| 7,195,444 B2* | 3/2007 | Brault | F01D 25/16 415/9 |
| 2009/0148271 A1* | 6/2009 | Alvanos | F01D 25/16 415/142 |
| 2010/0284817 A1* | 11/2010 | Bamberg | B23K 15/0046 416/241 R |
| 2011/0047959 A1 | 3/2011 | DiBenedetto | |
| 2012/0263579 A1 | 10/2012 | Otto et al. | |
| 2014/0356159 A1* | 12/2014 | Heikurinen | F04D 29/023 415/210.1 |

FOREIGN PATENT DOCUMENTS

| | | |
|---|---|---|
| EP | 1357295 | 10/2003 |
| EP | 2535528 | 12/2012 |
| WO | 2013184429 | 12/2013 |

OTHER PUBLICATIONS

Braeunling, Willy J. G., Aircraft Engines—Basics, Aero-Thermodynamics, Ideal and Real Cycle Processes, Thermal Turbomachinery, Components, Emissions and Systems, 2009, ISBN 978-3-540-7638-0 2009, Springer-Verlag Berlin Heidelberg.
German Search Report from counterpart German App No. 10 2013 213 517.3.

* cited by examiner

AIRCRAFT ENGINE

CROSS-REFERENCE TO RELATED APPLICATION

This application claims priority to German Patent Application No. 10 2013 213 517.3 filed on Jul. 10, 2013, the entirety of which is incorporated by reference herein.

BACKGROUND

This invention relates to an aircraft engine.

It is known to drive a fan of an aircraft engine directly by a central low-pressure shaft arranged on the axis of the aircraft engine and coupling said fan to a low-pressure turbine of the aircraft engine. A reduction gear between fan and low-pressure turbine is not provided here.

Anti-friction bearings arranged in bearing chambers are used for mounting the low-pressure shaft. Since enormous forces are generated in the area of the fan in the event of a failure leading to a rotor imbalance (e.g. loss or damage of a fan blade due to bird strike) and are transmitted to the shaft system in the form of bending forces, it is known, for example from FIG. 1 of US 2011/0047959 A1, to provide two front bearings for mounting the low-pressure shaft and for absorbing these bending forces acting on the low-pressure shaft. Due to the potentially high load forces, these bearings must be designed very sturdy and with a high weight.

SUMMARY

An object underlying the present invention is to mount a low-pressure shaft driving a fan of an aircraft engine such that load forces generated by an imbalance of the fan can be dependably absorbed in the event of a failure.

The solution in accordance with the invention is therefore based on the idea of arranging the frontmost bearing of the low-pressure shaft in the same plane, extending perpendicular to the longitudinal axis of the aircraft engine, in which the center of mass of the fan is also located. Compared with the state of the art, the frontmost bearing of the low-pressure shaft is thus moved further forward until it is located in the same axial plane as the center of mass of the fan. In other words, the frontmost bearing of the low-pressure shaft is in the plane established by the fan and extending perpendicular to the longitudinal axis of the aircraft engine in which the center of mass of the fan is also located.

The solution in accordance with the invention has the effect that the introduction of bending loads into the low-pressure shaft system in the event of a failure is minimized, and hence the load on the low-pressure shaft system during the occurrence of failures is considerably reduced. This is achieved in that the forces acting on the frontmost bearing are not increased by a lever due to the shift of the frontmost bearing into the center-of-gravity plane of the fan.

The solution in accordance with the invention furthermore has the advantage that the forward shift of the frontmost bearing in the axial direction and in the direction of the fan creates an additional construction/installation space between the two front bearings which can be used for the arrangement of further components in this area of the aircraft engine. This possibility is achieved in particular in that the two front bearings can be arranged at a greater axial distance from one another in comparison to the state of the art.

To allow the frontmost bearing of the low-pressure shaft to be arranged in the same plane as the center of mass of the fan, it is necessary that sufficient installation space is available between the low-pressure shaft and the fan hub in the radial direction. The aim must be that the hub/tip ratio of the fan is not increased despite arrangement of the frontmost bearing in the same plane as the center of mass of the fan. This is because the general aim is to design the hub/tip ratio of the fan as low as possible, so that in a turbofan engine as large as possible a hub pressure ratio can be achieved at the fan.

To provide an installation space sufficient for the frontmost bearing and at the same time achieve a low hub/tip ratio, it is provided in an embodiment of the invention that the fan is of BLISK design (BLISK="Blade Integrated Disk"), i.e. as a component designed in one piece and including both the fan blades and the fan disk. This is an integral blade/disk design allowing the separate blade/disk connections otherwise necessary to be dispensed with and thereby gaining more installation space in the radial direction. Moreover, weight is also saved by the integral blade/disk design. The same also applies when the fan is of BLING design (BLING="Bladed Ring"). With this design, the blades are made integral with the supporting ring in similar manner to the BLISK design.

Generally speaking, the fan can however be manufactured in any way, including conventionally with blade/disk connections.

Both with a conventional design and with a BLISK or BLING design, it can be provided that the front bearing has a lower radial overall height for a reduction or a further reduction of the installation space, so that said bearing can be provided in the installation space delimited in the radial direction by the internal diameter of the hub. To do so, it can for example be provided that the overall height of the bearing in the radial direction is less than 40% of the hub radius of the fan.

As already mentioned, the aim must be, despite the arrangement of the frontmost bearing in the plane of the center of mass of the fan, to keep the hub/tip ratio of the engine low. In design variants, this ratio is smaller than 0.35, in particular smaller than 0.3.

By the arrangement of the frontmost bearing in the plane of the center of mass of the fan, the distance between the two front bearings of the low-pressure shaft can be increased when compared with the state of the art, for example to create construction space for further components in the area between the two front bearings. It is here provided in an embodiment that the axial distance between the first and the second front bearing is greater than the hub radius of the fan.

A further advantage of the invention is that due to minimization of the introduction of bending loads into the low-pressure shaft system by arranging the frontmost bearing in the plane of the center of gravity of the fan, the second front bearing located axially behind it can be designed considerably weaker and with a lower weight than in the state of the art.

The first front bearing arranged in the plane of the center of gravity of the fan is designed as a roller bearing in an exemplary embodiment. The roller bearing absorbs radial forces, but not axial forces. It can be provided here that the second front bearing is designed as a ball bearing, for example as a deep-groove ball bearing that also absorbs axial forces. The axial mounting is thus provided by the second front bearing. In alternative embodiments, however, differing bearing configurations are also possible. Alternatively, it can for example be provided that the first front bearing, which is arranged in the plane of the center of mass of the fan, is designed as a ball bearing.

The at least two front bearings of the low-pressure shaft system can be arranged in a common bearing chamber or in separate bearing chambers. The bearing elements of the bearing chambers are lubricated with oil in a manner known per se, where bearing chamber seals are supplied with sealing air in order to prevent any oil leakage from the bearing chambers.

It is pointed out that the fan in accordance with the invention is not coupled to the low-pressure compressor via a reduction gear. The invention considers those aircraft engines in which the low-pressure shaft drives the fan without gear reduction and forms a continuous central shaft of the aircraft engine. In a two-shaft turbofan engine, the low-pressure shaft is surrounded by a high-pressure shaft that couples a high-pressure turbine to a high-pressure compressor. In the case of a three-shaft turbofan engine, a medium-pressure shaft is furthermore provided that couples a medium-pressure turbine to a medium-pressure compressor of the aircraft engine.

The arrangement of the frontmost bearing of the low-pressure shaft "substantially" in the plane of the center of mass of the fan means that the axial position of the bearing can be provided inside a certain area. This already results from the fact that the bearing has a certain axial extent, while the center of mass mathematically represents a point. The formulation that the first front bearing is arranged "substantially" in the same plane as the center of mass of the fan is intended in any event to cover those arrangements in which the frontmost bearing is arranged such that at least one bearing element of the frontmost bearing is intersected by the stated plane. Ideally, the center of mass of the bearing is arranged in the same plane, extending perpendicular to the longitudinal axis of the aircraft engine, as the center of mass of the fan (i.e. the two centers of mass coincide). As already explained, however, the invention also covers divergences from that ideal arrangement.

Moreover, the term "substantially" in the meaning of the invention must be understood in that the frontmost bearing is still arranged substantially in the same plane as the center of mass of the fan as long as at least one bearing element of the bearing is located in the cylinder volume extending between the hub of the fan and the low-pressure shaft, i.e. defined by the axial length of the fan hub. Stated more clearly, at least one bearing element of the first front bearing should thus be arranged in the installation space delimited radially on the outside by the hub of the fan and radially on the inside by the low-pressure shaft.

BRIEF DESCRIPTION OF THE DRAWINGS

The present invention is described in the following in more detail with reference to the figures of the accompanying drawing, showing an exemplary embodiment.

DETAILED DESCRIPTION

Figure 3:
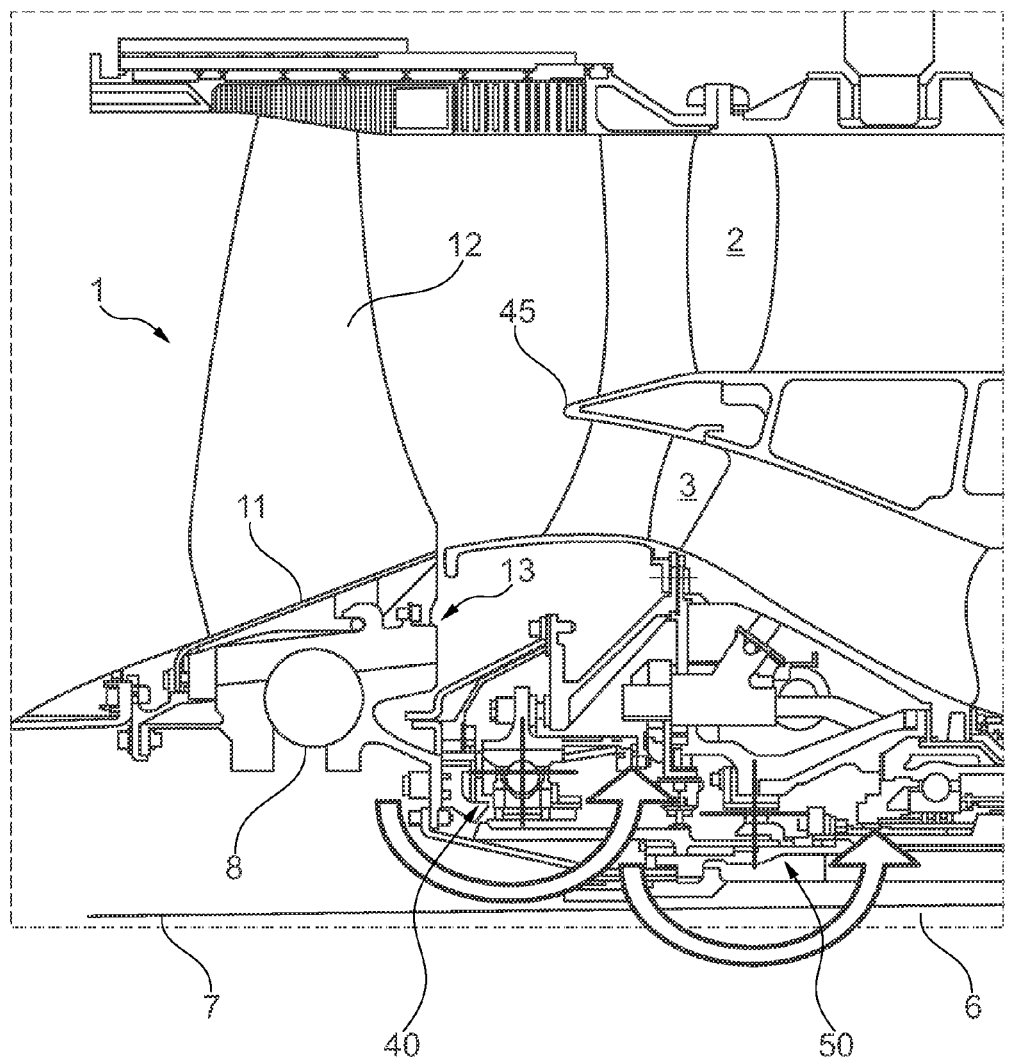
FIG. 3 shows components of a turbofan engine with two front bearings for a low-pressure shaft, which are not arranged in accordance with the present invention.

For a better understanding of the present invention, first a turbofan engine that manages without the solution in accordance with the invention is explained on the basis of FIG. 3.

The section through a turbofan engine shown in FIG. 3 includes a fan stage with a fan 1 having a hub 11 and blades 12. The blades 12 of the fan 1 are here connected to the hub 11 by blade/disk connections 13. The air mass ingested by the fan 1 is passed on the one hand into a bypass duct 2 and on the other hand into a primary flow duct 3. The bypass duct 2 and the primary flow duct 3 are separated from one another behind the fan 1 by a splitter 45. The primary flow duct 3 passes through the core engine.

The turbofan engine includes a low-pressure shaft 6 that couples a low-pressure turbine (not shown) to the fan 1 directly and without using a reduction gear. For mounting the low-pressure turbine 6, two bearings 40, 50 are provided which are spaced apart in the axial direction.

The two bearings 40, 50 in the front area of the low-pressure shaft system are used to absorb load forces which can be generated in the event of failure, for example loss or damage of one or more blades 12 of the fan 1. The resultant imbalance leads to enormous forces that are transmitted into the shaft system in the form of bending forces.

FIG. 3 illustrates such a case of failure. In normal operation, the center of mass 8 of the fan 1 is on the axis 7 of the engine. In the event of failure, e.g. loss of one or more blades 12, the center of mass shifts from the axis 7, for example into the position shown in FIG. 3. The imbalance resulting from the shift of the center of mass 8 leads to load forces that have to be absorbed by the two bearings 40, 50. The bearings 40, 50 must accordingly be designed such that they can absorb high forces in the event of a failure, meaning that the bearings 40, 50 must be designed sturdy and with high component weights, and consequently high component costs too. Another problem that can occur in the event of failure is that the low-pressure shaft 6 when under load comes into contact with other components, leading to critical states there.

Figure 1:
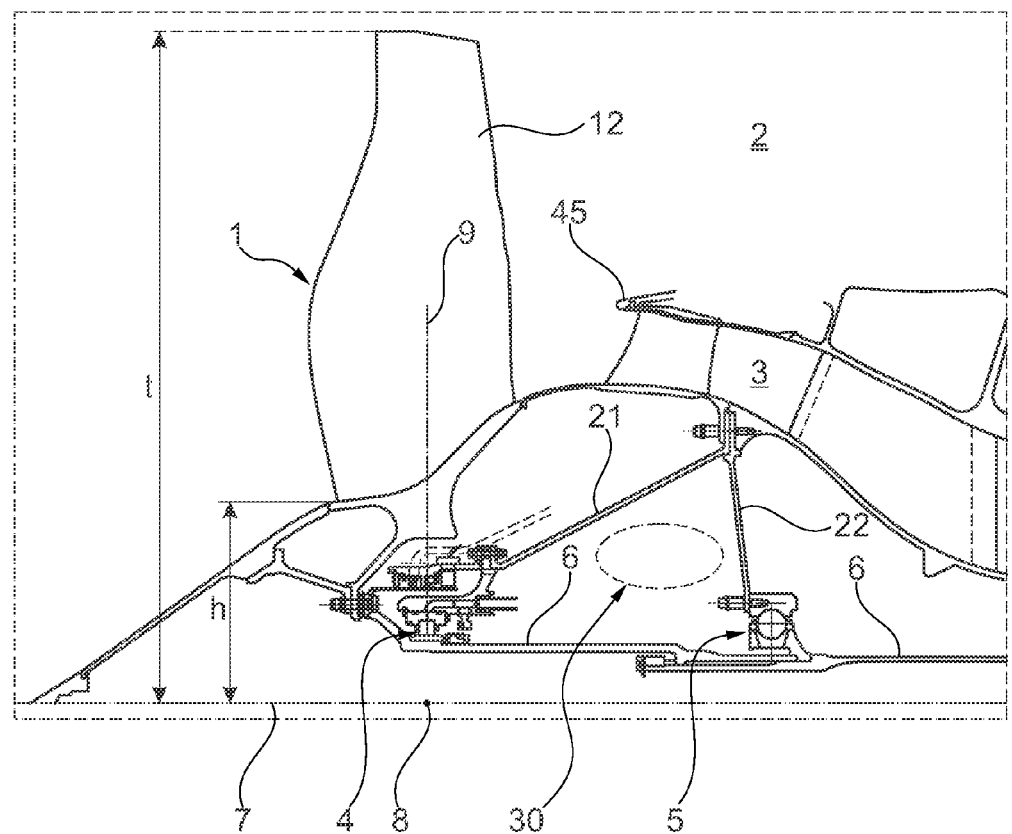
FIG. 1 shows components of an exemplary embodiment of a turbofan engine, illustrating a fan, a low-pressure shaft and two bearings for mounting the low-pressure shaft.
Figure 2:
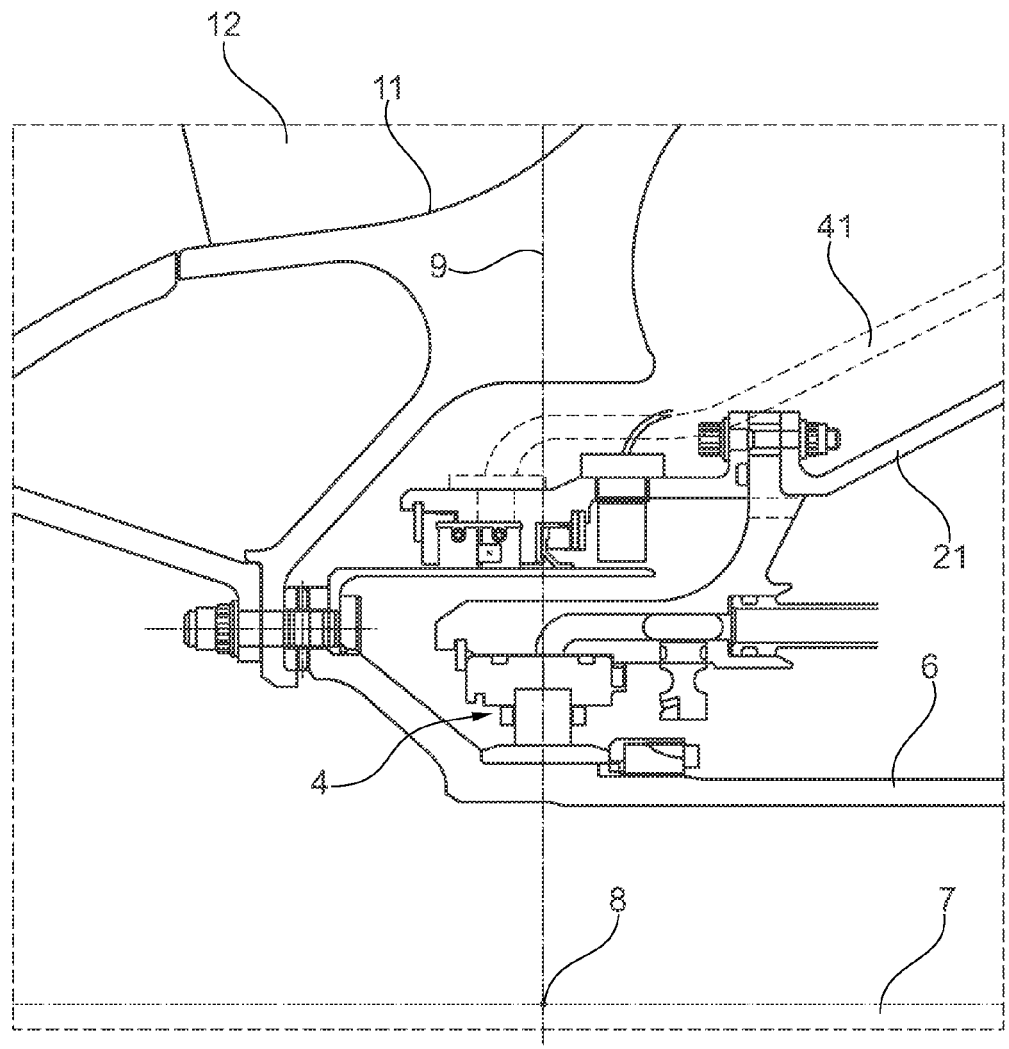
FIG. 2 shows the axial front bearing of the turbofan engine of FIG. 1 in an enlarged representation.

FIGS. 1 and 2 show an engine in accordance with the invention that provides an improved mounting of the low-pressure shaft 6.

Also in the engine of FIG. 1 a first axial front bearing 4 and a second axial front bearing 5 are provided for the low-pressure shaft 6. The two axial front bearings 4, 5 are in the following also referred to as first front bearing 4 and second front bearing 5.

It is provided that the first axial front bearing 4, representing the axially frontmost bearing, is arranged in the same plane 9 extending perpendicular to the longitudinal axis 7 of the aircraft engine in which the center of mass 8 of the fan 1 is also located. The center of mass is here arranged on the axis 7 in FIG. 8, i.e. this is not a case of failure. In the event of failure the center of mass 8 shifts from the axis 7.

Locating the bearing 4 in the axial plane 9 of the center of mass 8 prevents a lever action generated in aircraft engines not in accordance with the invention as per FIG. 3 due to the structural distance between the center of mass shifted from the axis 7 in the event of failure and the front bearings 4 and 5. As a result, the bending loads introduced into the low-pressure shaft system in the event of failure are minimized and the load on the low-pressure shaft system in the event of failure is considerably reduced.

In the exemplary embodiment of FIG. 1, the first front bearing 4 is designed for example as a roller bearing, so that it only absorbs radial forces. The second front bearing 5 offset axially thereto is designed for example as a ball bearing that can additionally absorb axial forces. Designing the first bearing 4 as a roller bearing dependably prevents tilting of the low-pressure axis 6 in the event of failure. Also, a roller bearing can be designed with a comparatively low radial overall height.

The second front bearing 5 can be designed comparatively weak and with lighter components, since the forces acting on it in the event of failure are considerably reduced by the shift of the first front bearing 4 into the plane 9 of the center of mass 8 of the fan 1 when compared to arrangements according to FIG. 3.

In FIG. 1 it can also be discerned that due to the shift of the front bearing 4 in the direction of the fan 1 a free space or casing area 30 is formed between casing components 21, 22 of the engine. This newly created casing area provides an additional construction space inside which further engine components can be arranged. It is advantageous here to select the largest possible axial distance between the first front bearing 4 and the second front bearing 5.

In the exemplary embodiment of FIG. 1, the fan 1 is of BLISK design, i.e. the fan has an integral blade/disk design. One of the advantages of this is that additional installation space is provided for arranging the first front bearing 4 in the plane 9 of the center of mass 8.

There are hence substantially three possibilities of arranging the first front bearing 4 between the low-pressure shaft 6 and the fan hub 11. A first possibility is to increase the internal diameter of the hub 11. Although this is possible in principle, it disadvantageously leads to an increasing hub/tip ratio h/t. The hub/tip ratio h/t is illustrated in FIG. 1. The value h indicates the radial distance between the axis 7 and the hub 11 (e.g. at the blade leading edge—inlet hub/tip ratio ("inlet h/t")). The value t indicates the radial distance between the axis 7 and the tips of the blades 12 of the fan 1. The aim is generally to achieve the lowest possible hub/tip ratio h/t, as this permits a high hub pressure ratio at the fan.

The exemplary embodiment of FIG. 1 therefore provides a second possibility of arranging the first front bearing 4 in the plane 9 of the center of mass 8 of the fan 1 and also between the low-pressure shaft 6 and the fan hub 11. According to this variant, the internal diameter of the fan 1 is increased in the area of the hub 11 by making the connection between the hub 11 and the blades 12 more compact and without structurally complex blade/disk connections. To do so, the fan is of BLISK design or BLING design. If a fan 1 in BLISK or BLING design is used, it is even possible for the hub/tip ratio to be reduced in comparison to fans with blade/disk connections, although the first front bearing 4 is arranged below the hub 11 in the plane of the center of mass 8 of the fan.

A third possibility for increasing the installation space, that can be implemented additionally to providing the fan 1 in BLISK or BLING design, is to provide the first front bearing 4 with the lowest possible overall height in the radial direction. To do so, in the exemplary embodiment of FIG. 1 the first front bearing 4 is provided as a roller bearing, which can be designed with a lower overall height than a ball bearing.

Generally speaking, it is however also possible to design, for example, the first front bearing 4 as a ball bearing and the second front bearing 5 as a roller bearing.

FIG. 2 shows an enlarged view of the first front bearing 4 of the engine of FIG. 1. The rotating components are shaded in grey here. It can be discerned that the roller bearing 4 extends in the plane 9, which runs perpendicular to the longitudinal axis 7 of the aircraft engine and in which the center of mass 8 of the fan is arranged.

In the exemplary embodiment shown in FIG. 2, the situation is even such that the center of mass of the roller bearing 4 is arranged in the plane 9. The principles of the present invention are however also achieved when at least one bearing element of the front bearing 4 is intersected at any point by the plane 9, i.e. the center of mass of the bearing 4 is not necessarily in the plane 9.

FIG. 2 shows further typical elements of a bearing of a low-pressure shaft 6 in an aircraft engine, such as a supply line 41 for sealing air to seal bearing chamber seals of a bearing chamber. These components, known per se to the person skilled in the art, are not dealt with here as they are immaterial for the present invention.

The present invention, in its design, is not restricted to the exemplary embodiments presented above, which are only to be understood as examples. In particular the layout of the bearings 4, 5 and the layout and design of the fan 1 must be understood only as examples. It is also pointed out that the invention can be implemented not only in a turbofan engine, but also in any other engine with a fan on the intake side.

What is claimed is:

1. An aircraft engine comprising:
    a fan having a center of mass,
    a low-pressure shaft that couples the fan directly to a low-pressure turbine of the aircraft engine, and
    a bearing arrangement for mounting the low-pressure shaft, where the bearing arrangement includes a first front bearing and a second front bearing, both mounting the low-pressure shaft, with the first front bearing being arranged in an axial direction in front of the second front bearing,
    wherein the first front bearing is arranged such that a same plane, extending perpendicular to a longitudinal axis of the aircraft engine, substantially intersects both the center of mass of the fan and at least one bearing element of the first front bearing.

2. The aircraft engine in accordance with claim 1, wherein the fan is provided in BLISK or BLING design.

3. The aircraft engine in accordance with claim 1, wherein the first front bearing has a low radial overall height.

4. The aircraft engine in accordance with claim 3, wherein the radial overall height of the first front bearing is less than 40% of a hub radius of the fan.

5. The aircraft engine in accordance with claim 1, wherein a hub/ tip ratio of the fan is smaller than 0.35.

6. The aircraft engine in accordance with claim 1, wherein an axial distance between the first front bearing and the second front bearing is at least equal to a hub radius of the fan.

7. The aircraft engine in accordance with claim 1, wherein the second front bearing is configured to handle a lower loading than the first front bearing.

8. The aircraft engine in accordance with claim 1, wherein the first front bearing is a roller bearing.

9. The aircraft engine in accordance with claim 8, wherein the second front bearing is a ball bearing.

10. The aircraft engine in accordance with claim 1, wherein the first front bearing is a ball bearing.

11. The aircraft engine in accordance with claim 1, wherein the first and second front bearings are arranged in a common bearing chamber.

12. The aircraft engine in accordance with claim 1, wherein a center of mass of the first front bearing is arranged in the same plane, extending perpendicular to the longitudinal axis of the aircraft engine, as the center of mass of the fan.

13. The aircraft engine in accordance with claim 1, wherein the fan is not coupled to the low-pressure compressor via a reduction gear.

14. The aircraft engine in accordance with claim 1, wherein the engine is a turbofan engine.

15. The aircraft engine in accordance with claim 1, wherein a hub/ tip ratio of the fan is smaller than 0.3.

16. The aircraft engine in accordance with claim 1, wherein the first and second front bearings are arranged in separate bearing chambers.

* * * * *